United States Patent [19]

Geiger et al.

[11] Patent Number: 5,081,534
[45] Date of Patent: Jan. 14, 1992

[54] TELEVISION RECEIVER WITH REMOTE CONTROL SYSTEM CAPABLE OF CONTROLLING ASSOCIATED PERIPHERAL DEVICES MANUFACTURED BY DIFFERENT COMPANIES

[75] Inventors: Erich Geiger, Unterkirnach; Rolf Schiering, Hemmingen, both of Fed. Rep. of Germany

[73] Assignee: Deutsche Thomson Brandt GmbH, Villingen-Schwenningen, Fed. Rep. of Germany

[21] Appl. No.: 389,729

[22] Filed: Aug. 4, 1989

[30] Foreign Application Priority Data

Aug. 10, 1988 [DE] Fed. Rep. of Germany ....... 3827050

[51] Int. Cl.$^5$ .............................................. H04N 5/44
[52] U.S. Cl. .......................... 358/194.1; 340/825.69;
     455/151; 455/353; 359/146
[58] Field of Search ................. 358/194.1; 455/151,
     455/352, 353, 603; 340/825.69

[56] References Cited

U.S. PATENT DOCUMENTS

| | | | |
|---|---|---|---|
| 4,334,242 | 6/1982 | Mangold | 358/194.1 |
| 4,519,003 | 5/1985 | Scholz | 358/335 |
| 4,623,887 | 11/1986 | Welles, II | 358/194.1 |
| 4,626,848 | 12/1986 | Ehlers | 340/825.69 |
| 4,774,511 | 9/1988 | Rumbolt et al. | 340/825.69 |
| 4,802,114 | 1/1989 | Sogame | 455/603 |
| 4,807,052 | 2/1989 | Amano | 358/194.1 |
| 4,817,203 | 3/1989 | Tsurumoto et al. | 455/603 |
| 4,965,557 | 10/1990 | Shepers et al. | 340/711 |

FOREIGN PATENT DOCUMENTS

| | | |
|---|---|---|
| 0057914 | 8/1982 | European Pat. Off. |
| 0103707 | 3/1984 | European Pat. Off. |
| 2939589 | 4/1981 | Fed. Rep. of Germany |
| 3104843 | 8/1982 | Fed. Rep. of Germany |
| 3335082 | 4/1985 | Fed. Rep. of Germany |
| 3544183 | 6/1987 | Fed. Rep. of Germany |
| 0187978 | 8/1988 | Japan |
| 2155713 | 9/1985 | United Kingdom |
| 2197104 | 5/1988 | United Kingdom |

OTHER PUBLICATIONS

"Design of Real-Time Computer Systems", J. Martin, copyright 1967, Prentis Hall, pp. 275-276.
German Language Article, "From Remote Control to Learn Control", H. Hafner, Funkschau, 17/1987, pp. 20-27.

Primary Examiner—Tommy P. Chin
Attorney, Agent, or Firm—Joseph S. Tripoli; Peter M. Emanuel

[57] ABSTRACT

A control arrangement for a home entertainment unit, including a television receiver and one or more peripheral devices, such as a video recorder, coupled to the television receiver, includes a single remote control transmitter for transmitting a remote control signal to the television receiver, which, in turn, passes on control instructions to the peripheral devices. To allow such a remote control operation, even when one or more of the peripheral devices is produced by a manufacturer different than that of the television receiver and which therefore requires a different remote control code, the television receiver has a memory in which, under the control of a microprocessor, the remote control codes allocated to respective function control keys of the remote control transmitter supplied with a peripheral device are stored during a learning process. During the learning process, the screen of the television receiver displays messages for instructing the user which function control key of the remote control transmitter associated with the peripheral device to press. Thereafter, when a device function control key of the remote control transmitter supplied with the television receiver is pressed, the microprocessor, working in conjunction with the memory, converts or translates the codes contained within the received remote control messages to codes corresponding to the peripheral device and a correspondingly encoded remote control signal is relayed by the television receiver to the peripheral device.

9 Claims, 1 Drawing Sheet

| FUNCTION | CODE FOR T | CODE FOR G |
|---|---|---|
| PLAY | C11 → | C21 |
| RECORD | C12 → | C22 |
| STOP | C13 → | C23 |
| REWIND | C14 → | C24 |
| FAST FORWARD | C15 → | C25 |

5,081,534

TELEVISION RECEIVER WITH REMOTE CONTROL SYSTEM CAPABLE OF CONTROLLING ASSOCIATED PERIPHERAL DEVICES MANUFACTURED BY DIFFERENT COMPANIES

FIELD OF THE INVENTION

The disclosed embodiment of the invention concerns an improvement to a remote control arrangement for a television system of the type in which a television receiver is coupled to associated peripheral devices by a wired or wireless control path. The receiver receives remote control signals for controlling the peripheral devices and in response supplies corresponding control signals to the peripheral devices through the control path. The peripheral devices may include, e.g., one or more of a video cassette recorder (VCR), video disk player (VDP) a compact disk (CD) player and a digital audio tape (DAT) player. Such a television system, utilizing infra-red radiation (IR) via the remote control channel of a peripheral device as the control channel, is disclosed in German Patent DE-OS 35 44 183, particularly with respect to "programming" a VCR for automatic future recording.

BACKGROUND OF THE INVENTION

So-called "unified" remote control transmitters are known for controlling a television receiver and one or more peripheral devices associated with the television receiver. It is a prerequisite for such a "unified" remote control transmitter that the codes sent by the remote control transmitter for various functions of the peripheral devices correspond to the codes allocated to these functions in the devices. If the television receiver with its remote control transmitter and the peripheral devices are produced by the same manufacturer, this will generally be the case. In this situation, the control codes for the various function for the various devices are known in advance by the manufacturer and may be stored during manufacture in the "unified" remote control transmitter.

If, however, the television receiver and the peripheral devices are manufactured by different companies, the remote control codes of the television receiver and peripheral devices may not match.

Of course, in this case, it is possible to use the individual remote control transmitters which may be provided with respective ones of the television receiver and peripheral devices This leads to an inconvenient clutter of remote control transmitters.

To solve this problem, remote control transmitters capable of controlling a television receiver and associated peripheral devices which are produced by different manufacturers and which therefore may not share a common code configuration, have been devised.

For example, so called "universal" remote control transmitters, in which the remote control codes for various functions of various devices manufactured by different companies are stored in advance during manufacture, are known. Such a "universal" remote control transmitter is disclosed in U.S. Pat. No. 4,774,511 (Rumbolt et al.). This solution requires a large memory. More importantly, it does not readily allow for expansion (i.e., adding new devices).

So called "reconfigurable" remote contol transmitters which are capable of learning the remote control codes for various functions of various devices manufactured by different companies, are also known. Such remote control transmitters are described in U.S. Pat. No. 4,623,887 (Welles, II) and U.S. Pat. No. 4,802,114 (Sogame). This type of remote control transmitter is a special purpose device which includes an infra-red (IR) transducer and associated processing circuitry for receiving IR remote control messages to be learned from various remote control transmitters, in addition to a conventional IR transducer and associated circuitry for transmitting IR remote control messages.

SUMMARY OF THE INVENTION

The present invention is directed especially to, and takes special advantage, of television systems of the type described in German Patent DE-OS 35 44 183 referred to above in which a television receiver is coupled by a control path to the peripheral devices and serves as a receiving and relay station for the signals sent by its remote control transmitter and passes received remote control signals on to the peripheral devices.

Specifically, according to the invention, the television receiver performs a "learning" process in which it learns the previously unknown codes for various functions of a peripheral device from the remote control transmitter supplied by the manufacturer of the peripheral device and stores them. The television receiver then "knows" which of the previously unknown remote control codes for various functions must be sent to the peripheral device. Accordingly, after the learning process has been performed, when the remote control signal for a particular function of the peripheral device is received from a "unified" remote control transmitter supplied by the manufacturer of the television receiver, the television receiver automatically converts the code (which is not suitable for the peripheral device) of the received remote control signal into a new code, suitable for controlling the respective function of the peripheral device.

Preferably, according to a feature of the invention, during the learning process, various functions of the peripheral device, such as, e.g., channel selection, "start", "stop", "rewind", "fast foward", and various programming operations, associated with a video recorder, are displayed on the screen of the television and the user is instructed to press the corresponding function keys of the remote control transmitter of the video recorder, one after the other. In response, the corresponding remote control signals are then sent to the television receiver and, after decoding, the corresponding codes are stored in such a way that they can be recalled when the respective keys of the "unified" remote control supplied by the manufacturer of the television receiver are pressed. The television receiver thereby serves as a receiving, translation and relay station for the remote control signals sent by its remote control transmitter. The television receiver may pass the control signals on to the peripheral devices via wired or via wireless means, e.g., such as by an infra-red coupling.

It is a prime advantage of the invention that the television receiver and peripheral devices may be manufactured by different companies and the remote control codes used by them for various functions may be very different. Accordingly, a component audio/video home entertainment unit comprising the television receiver and peripheral devices is no longer restricted by the remote control codes conforming to the standard of a single manufacturer but can process various remote control codes of different manufacturers. Thus, the television receiver as well as the peripheral devices coupled to it can be controlled by the same remote control transmitter, i.e., different remote control transmitters are no longer required for the television receiver and peripheral devices. After the "learning" process has been performed, only the remote control transmitter of the television receiver is needed and all the other remote control transmitters supplied with the peripheral devices can be put away.

It is another advantage of the invention that no alterations are necessary for the remote control units, as the conversion between the different codes is performed in the television receiver itself. In addition, a special purpose "reconfigurable" remote control transmitter is not needed.

The invention is useful for all types of control instructions for the peripheral devices. For example, with respect to a video recorder, the functions which may be controlled include: "play", "record", "stop", "rewind", "fast foward", "search", "start", "time setting", "channel selection"" and "programming".

BRIEF DESCRIPTION OF THE DRAWING

The invention is described by way of an example illustrated in an accompanying Drawing in which.

DETAILED DESCRIPTION OF THE DRAWING

Figures 1, 2:
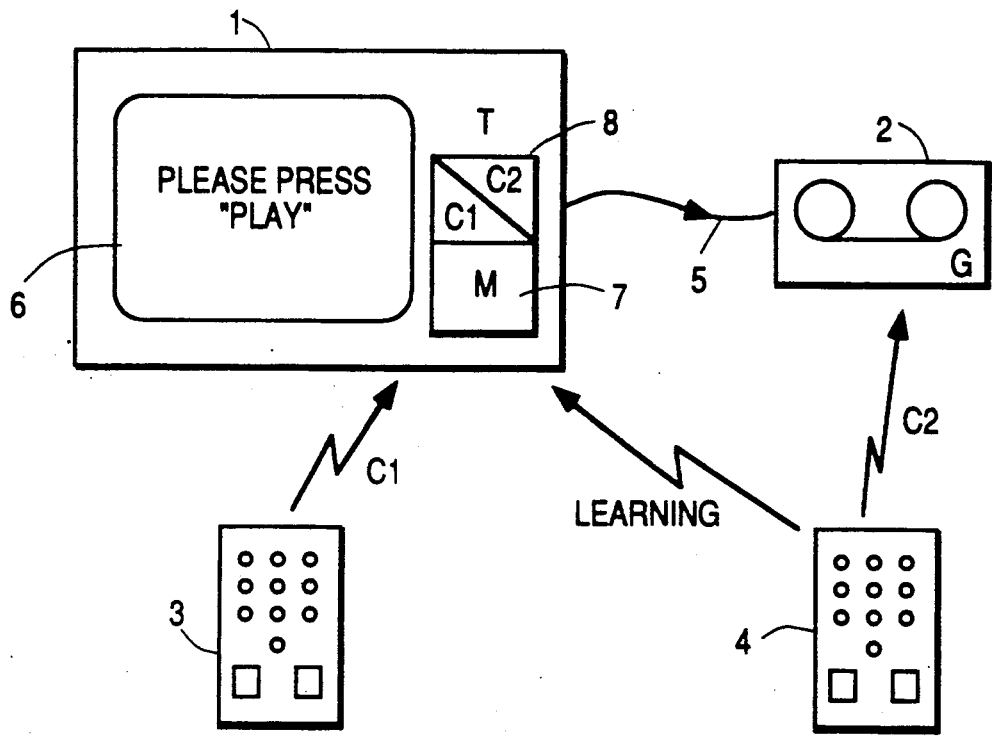
FIG. 1 shows, in block form, a remote control system for a home entertainment system, in which a television receiver is coupled to a video recorder as the peripheral device.
FIG. 2 shows a table illustrating an aspect of the control operation of the remote control system shown in FIG. 1.

In FIG. 1, a television receiver 1 is coupled to video recorder 2 via a control path 5, to be described in greater detail below. Other peripheral devices (not shown) may also be coupled to television receiver 1 via control path 5. Audio and video signal paths between television receiver 1 and various peripheral devices have not been shown for the sake of simplicity.

The television receiver 1 can be operated by a remote control transmitter 3 which sends out coded remote control signals indicated by C1.The video recorder 2 can be operated by a remote control transmitter 4 which sends out coded remote control signals indicated by C2. The remote control transmitter 3 associated with television receiver 1 is a "unified" remote control transmitter of the type referred to above which has keys for controlling various functions of the television receiver 1 and also various functions of one or more peripheral devices, such as the video recorder 4.

Let it be assumed that the television receiver 1 is manufactured by a company T, whereas the video recorder 2 is manufactured by company G, and that the code formats for C1 and C2 do not match. In this situatioh, it is not possible to control the video recorder 2 via the television receiver 1 by operating remote control transmitter 3 to transmit the coded remote control signal C1 used by the company T for the functions of a video recorder. Since the video recorder 2 requires different codes C2 used by company G to control of various functions of video recorder 2, the codes C2 are not stored in the remote control transmitter 3 and, therefore, cannot be transmitted by it. This obstacle is eliminated in the following way.

During a learning mode of the remote control system, initiated, e.g., by pressing a respective key of the remote control transmitter 3, the user is instructed by messages displayed on the screen 6 of the television receiver 1 to point the remote control transmitter 4 at the television receiver 1 and to press the keys of the remote control transmitter 4 corresponding to the respective functions of the video recorder 2, one at a time. As each key is pressed, the remote control transmitter 4 transmits the corresponding coded remote control signal (C2) to the television receiver 1 (as indicated by remote control signal path labelled "learning"). The received remote control signal is decoded and the code C2 is stored in a as the valid code allocated to the respective function of the video recorder 2 in a memory 7 under the control of a microprocessor 8. This process is confirmed by a respective messaged displayed on the screen 6 of television receiver 1. For example, the message may read: "Code for function PLAY learned" or "PLAY-function for video recorder learned". In this way, various codes 2 for respective functions of the video recorder 2 corresponding to keys of the remote control transmitter 3 associated with television receiver 1 are obtained and stored in the memory 7 in response to the instructions displayed on the sceeen 6, one after the other.

The table shown in FIG. 2, represents the data stored in memory 7 relative to the remote control learning process described above. For each function, the respective codes associated with remote control transmitter 3 supplied with the television receiver 1 by company T and remote control transmitter 4 supplied with the video recorder 4 by company G are indicated. The first number after the letter "C" indicates which one of the remote control transmitters 3 and 4 is the source ("1" for remote control transmitter 3 and "2" for remote control transmitter 4); and the second number corresponds to the respective function (e.g., "1" for PLAY).

The remote control signals may be "learned" and stored in the manner described in the aforementioned Welles, II and Sogame patents. In these patents, the remote control signals are stored in compressed form to save memory space.

Once the "learning" process has been completed, when the key of remote control transmitter 3 for a particular function, e.g., "PLAY" is pressed, the appropriate code, e.g, the code C11 for PLAY (which is not valid for the video recorder 2) is automatically converted in the television receiver 1 by the microprocessor 8 in conjunction with memory 7 into the code C21 (which is valid for the video recorder 2). A correspondingly coded remote control signal is formed and coupled to the recorder 2 via the control path 5 and initiates the desired PLAY function there.

In summary, for various controllable functions of the recorder 2, a conversion of the respective code C1 used by company T to the respective code C2 used company G is performed within television receiver 1. This translation, made possible by the learning process performed by the microprocessor 8, is indicated by the horizontal lines in FIG. 2. Specifically, according to FIG. 2, after the learning function has been performed, when the remote control transmitter 3 made by the company T transmits any of the remote control signals corresponding to the codes C11 through C15, a remote control signal corresponding to the respective one of codes C21 through C25 is relayed by the television receiver 1 to video recorder 2.

In the same way, various other peripheral devices manufactured by different companies (e.g., a CD player manufactured by company H, an AM or FM receiver manufactured by company D, or a DAT player manufactured by company F) connected to the television receiver 1 can be controlled by the remote control transmitter 3, even when these devices require very different code formats for controlling their functions.

Control path 5 can take various forms. As disclosed in German Patent DE-OS 35 44 183, referred to above, control path 5 may be wireless, by means of, e.g., an IR link, between an IR transmitter in the television receiver 1 and the remote control receiver in the video recorder 2 (normally used in conjunction with the remote control transmitter 4). If desired, the radiation may be coupled via a fiber-optic cable. Alternatively, control path 5 may be wired. In this case, an electrical signal corresponding to the remote control signal is coupled by the wire to a point within the remote control receiver system of the video recorder 2 at a point after the IR transducer which converts IR signals to electrical signals.

While the present invention has been described, by way of example, with respect to a system in which a television receiver includes the memory and microprocessor for converting or translating the codes, it will be appreciated that the converting apparatus may also be included in another device, such as a video recorder to which other peripheral devices, including a television receiver, are coupled. In that case, the on-screen messages for instructing the user during the learning process may be coupled to the television receiver for display. These and other modifications are contemplated to be within the scope of the invention defined by the following claims.

We claim:

1. In a system including a main video or audio signal processing device capable of generating and transmitting first function control signals having a first code format to at least one peripheral video or audio signal processing device of a given type that may be coupled to said main device to control various functions of said peripheral device in response to remote control signals corresponding to said first code format received from a remote control transmitter, apparatus included in said main device for allowing another peripheral video or audio signal processing device of said given type that also may be coupled to said main video or audio signal processing device but which responds to second function control signals having a second code format, different from said first code format, to be controlled by said remote control transmitter in response to said remote control signals corresponding to said first code format, said apparatus comprising:

memory means for storing said second function control signals corresponding to said second code format;

converting means coupled to said memory means and operating in conjunction therewith for generating said second function control signals having said second code format in response to respective ones of said remote control signals corresponding to said first code format during a normal mode of operation; and coupling means for coupling said second function control signals to said other peripheral device from said main device during said normal mode of operation;

said other peripheral device having associated with it another remote control transmitter for generating remote control signals allocated to various functions of said other peripheral device and corresponding to said second code format;

said main device responding to said remote control signals corresponding to said second code format for storing said second function control signals in said memory means in a manner allocated to respective ones of said remote control signals corresponding to said first code format during a learning mode of operation.

2. The system define in claim 1, wherein:
said main device is a television receiver and said one and said other peripheral devices are video recorders.

3. The system defined in claim 1, wherein:
said television receiver includes display means for displaying an image in response to a video signal during said normal mode of operation; and
said display means displays messages for instructing a user to operate said remote control transmitter associated with said other peripheral device to allocate said first function control signals to various functions of said other peripheral device during said learning mode of operation.

4. The system defined in claim 3, wherein:
said instructions instruct the user to press function keys of said remote control transmitter of said other peripheral device to allocate said first function control signals to various functions of said other peripheral device one after another during said learning mode of operation.

5. The system defined in claim 3, wherein:
said massages include lettered characters.

6. The system defined in claim 3, wherein:
said instructions instruct the user as to which function keys of said remote control transmitter of said other peripheral device to press to allocate said first function control signals to various functions of said other peripheral device during said learning mode.

7. The system defined in claim 1, wherein:
said main device generates remote control signals corresponding to said second code format in response to remote control signals of said first code format during said normal mode of operation; and
said coupling means includes remote control transmitter means for coupling said remote control signals corresponding to said second code format to said other peripheral device.

8. In a system including a main video or audio signal processing device capable of generating and transmitting first function control signals having a first code format to at least one peripheral video of audio signal processing device of a given type that may be coupled to said main device to control various functions of said peripheral device in response to remote control signals corresponding to said first code format received from a remote control transmitter, apparatus included in said main device for allowing another peripheral video or audio signal processing device of said given type that also may be coupled to said main video or audio signal processing device but which responds to second function control signals having a second code format, different from said first code format, to be controlled by said remote control transmitter in response to said remote control signals corresponding to said first code format, said apparatus comprising:

memory means for storing said second function control signals corresponding to said second code format;

converting means coupled to said memory means and operating in conjunction therewith for generating said second function control signals having said second code format in response to respective ones of said remote control signals corresponding to said first code format during a normal mode of operation; and coupling means for coupling said second function control signals to said other peripheral device from said main device during said normal mode of operation;

said other peripheral device having associated with it another remote control transmitter for generating remote control signals allocated to various functions of said other peripheral device and corresponding to said second code format;

said main device responding to said remote control signals corresponding to said second code format for storing said second function control signals in said memory means in a manner allocated to respective ones of said remote control signals corresponding to said first code format during a learning mode of operation;

said main device further including display means for displaying an image in response to a video signal during said normal mode of operation;

said display means displaying messages for instructing a user to operate said remote control transmitter associated with said other peripheral device to allocate said first function control signals to various functions of said other peripheral device during said learning mode of operation;

said instructions instructing the user as to which function keys of said remote control transmitter of said other peripheral device to press to allocate said first function control signals to various functions of said other peripheral device during said learning mode.

9. In a system including a main video or audio signal processing device capable of generating and transmitting first function control signals having a first code format to at least one peripheral video or audio signal processing device of a given type that may be coupled to said main device to control various functions of said peripheral device in response to remote control signal corresponding to said first code format received form a remote control transmitter, apparatus included in said main device for allowing another peripheral video or audio signal processing device of said given type that also may be coupled to said main video or audio signal processing device but which responds to second function control signals having a second code format, different from said first code format, to be controlled by said remote control transmitter in response to said remote control signals corresponding to said first code format, said apparatus comprising:

memory means for storing said second function control signals corresponding to said second code format;

converting means coupled to said memory means and operating in conjunction therewith for generating said second function control signals having said second code format in response to respective ones of said remote control signals corresponding to said first code format during a normal mode of operation; and coupling means for coupling said second function control signals to said other peripheral device from said main device during said normal mode of operation;

said other peripheral device having associated with it another remote control transmitter for generating remote control signals allocated to various functions of said other peripheral device and corresponding to said second code format;

said main device responding to said remote control signals corresponding to said second code format for storing said second function control signals in said memory means in a manner allocated to respective ones of said remote control signals corresponding to said first code format during a learning mode of operation;

said main device generating remote control signals corresponding to said second code format in response to remote control signals of said first code format during said normal mode of operation;

said coupling means including remote control transmitter means for coupling said remote control signals corresponding to said second code format to said other peripheral device.

* * * * *